United States Patent
Chang et al.

(10) Patent No.: US 11,048,093 B2
(45) Date of Patent: Jun. 29, 2021

(54) HEAD-MOUNTED DISPLAY DEVICE

(71) Applicant: HTC Corporation, Taoyuan (TW)

(72) Inventors: Jen-Yang Chang, Taoyuan (TW);
Chang-Hua Wei, Taoyuan (TW);
Wei-Hsin Chang, Taoyuan (TW);
Hung-Chuan Wen, Taoyuan (TW);
Jui-Hsiang Lin, Taoyuan (TW);
Sheng-Cherng Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 438 days.

(21) Appl. No.: 15/896,067

(22) Filed: Feb. 14, 2018

(65) Prior Publication Data

US 2018/0239151 A1    Aug. 23, 2018

Related U.S. Application Data

(60) Provisional application No. 62/462,290, filed on Feb. 22, 2017.

(51) Int. Cl.
*G02B 27/01* (2006.01)

(52) U.S. Cl.
CPC ....... *G02B 27/0176* (2013.01); *G02B 27/017* (2013.01)

(58) Field of Classification Search
CPC .............. G02B 27/017; G02B 27/0176; G02B 27/0172; A61F 9/026; A61F 9/02; B63C 11/12; A41D 13/11; A41D 13/1184
USPC ................... 345/8; 2/451, 454, 15, 426, 428
See application file for complete search history.

(56) References Cited

U.S. PATENT DOCUMENTS

| | | | |
|---|---|---|---|
| 5,276,471 A | * | 1/1994 | Yamauchi .......... G02B 27/0176 351/153 |
| 6,369,952 B1 | | 4/2002 | Rallison et al. |
| 7,038,639 B1 | | 5/2006 | Olstad et al. |
| 10,045,449 B1 | * | 8/2018 | Yee ..................... G02B 27/0176 |
| 2004/0061663 A1 | | 4/2004 | Reynolds et al. |

(Continued)

FOREIGN PATENT DOCUMENTS

| | | |
|---|---|---|
| CN | 105388615 | 3/2016 |
| CN | 205281024 | 6/2016 |

(Continued)

OTHER PUBLICATIONS

"Office Action of China Counterpart Application", dated Mar. 2, 2020, p. 1-p. 11.

(Continued)

*Primary Examiner* — Amy Vanatta
(74) *Attorney, Agent, or Firm* — JCIPRNET

(57) ABSTRACT

A head-mounted display device includes a front piece and an annular piece. The front piece is adapted for placing a display device. The annular piece includes a pair of compression portions and a pair of rotating portions. The pair of rotating portions are respectively located at two opposite ends of each of the pair of compression portions. The annular piece is connected to the front piece via the pair of compression portions. When the pair of compression portions are compressed toward the front piece, the pair of rotating portions are adapted to be rotated relative to the pair of compression portions by the pair of compression portions being compressed, and rotation directions of the pair of rotating portions are opposite to each other.

15 Claims, 6 Drawing Sheets

(56) References Cited

U.S. PATENT DOCUMENTS

| | | |
|---|---|---|
| 2009/0059501 A1 | 3/2009 | Yamaguchi |
| 2009/0201466 A1 | 8/2009 | Knecht et al. |
| 2011/0225709 A1 | 9/2011 | Saylor et al. |
| 2012/0204303 A1 | 8/2012 | Seo |
| 2013/0222213 A1* | 8/2013 | Abdollahi .......... G02B 27/0176 345/8 |
| 2014/0098009 A1 | 4/2014 | Prest et al. |
| 2014/0115761 A1* | 5/2014 | McNeal ................ G02C 5/122 2/439 |
| 2015/0103152 A1 | 4/2015 | Qin |
| 2015/0234189 A1 | 8/2015 | Lyons |
| 2015/0320600 A1 | 11/2015 | Blanchard et al. |
| 2016/0062125 A1* | 3/2016 | Baek ...................... G06F 1/163 361/679.01 |
| 2017/0153672 A1* | 6/2017 | Shin ....................... G06F 1/169 |
| 2017/0290706 A1* | 10/2017 | Chiang ................ A63B 33/002 |
| 2017/0326462 A1 | 11/2017 | Lyons et al. |
| 2018/0035561 A1* | 2/2018 | Lee ......................... G06T 19/00 |
| 2018/0338130 A1* | 11/2018 | Miller .................. H04N 13/398 |
| 2019/0113773 A1* | 4/2019 | Langenwalter ......... A61F 9/025 |
| 2019/0235254 A1* | 8/2019 | Kamakura .......... G02B 27/0176 |

FOREIGN PATENT DOCUMENTS

| | | |
|---|---|---|
| CN | 205608298 | 9/2016 |
| CN | 205809415 | 12/2016 |
| CN | 205958855 | 2/2017 |
| ES | 1166308 | 10/2016 |
| TW | M525770 | 7/2016 |

OTHER PUBLICATIONS

"Search Report of European Counterpart Application," dated Jul. 25, 2018, pp. 1-10.

"Notice of Allowance of Taiwan Counterpart Application," dated Jun. 15, 2018, pp. 1-5.

* cited by examiner

HEAD-MOUNTED DISPLAY DEVICE

CROSS-REFERENCE TO RELATED APPLICATION

This application claims the priority benefit of U.S. provisional application Ser. No. 62/462,290, filed on Feb. 22, 2017. The entirety of the above-mentioned patent application is hereby incorporated by reference herein and made a part of this specification.

BACKGROUND

Technical Field

The disclosure relates to a display device and more particularly relates to a head-mounted display device.

Description of Related Art

As the technology industry prosper day by day, the forms, functions and appliances of electronic device become more and more diverse. As such, wearable electronic device that the user can directly wear on his/her body is also developed. There are many kinds of head-mounted electronic devices. Taking those in forms of an eye mask for example, when the user puts on an eye mask head-mounted electronic device of this kind, in addition to three-dimensional images, the images further change with the turning of his/her head. An eye mask head-mounted electronic device of this kind brings a more immersive feeling to the user.

However, in the current head-mounted electronic device, a component for contacting the face is mainly a single-piece face member or a gasket. As such, under long-term wearing, uncomfortable feelings are often caused by the user's difficulty in adjusting properly, thereby causing a poor user experience.

SUMMARY

The disclosure provides a head-mounted display device that effectively blocks the external ambient light from entering and can brings a more comfortable experience.

A head-mounted display device according to an embodiment of the disclosure includes a front piece and an annular piece. The front piece is adapted for placing a display device. The annular piece is adapted to contact an user's face. The annular piece includes a pair of compression portions and a pair of rotating portions. The pair of rotating portions are respectively located at two opposite ends of each of the pair of compression portions. The annular piece is connected to the front piece via the pair of compression portions. When the pair of compression portions are compressed toward the front piece, the pair of rotating portions are adapted to be rotated relative to the corresponding compression portions by the pair of compression portions being compressed, and rotation directions of the pair of rotating portions are opposite to each other.

A head-mounted display device according to another embodiment of the disclosure includes a front piece and an annular piece. The front piece is adapted for placing a display device. The annular piece includes a pair of compression portions and a pair of rotating portions. The pair of rotating portions are respectively located at two opposite ends of each of the pair of compression portions. The annular piece is connected to the front piece via the pair of compression portions. When the pair of compression portions are compressed toward the front piece, the pair of rotating portions are adapted to be rotated relative to the pair of compression portions by the pair of compression portions being compressed, and rotation directions of the pair of rotating portions are opposite to each other.

Based on the foregoing, in the embodiments of the disclosure, the annular piece includes a pair of compression portions and a pair of rotating portions, the head-mounted display device is compressed toward the front piece by an external force applied by the user's face. Also, by the pair of compression portions being compressed, two rotating portions are rotated relative to the pair of compression portions so as to conform to the peripheral of the user's eyes and thereby effectively block the external ambient light from entering the head-mounted display device, so that the user obtains a better experience.

To make the aforementioned more comprehensible, several embodiments accompanied with drawings are described in detail as follows.

DESCRIPTION OF THE EMBODIMENTS

Figure 1:
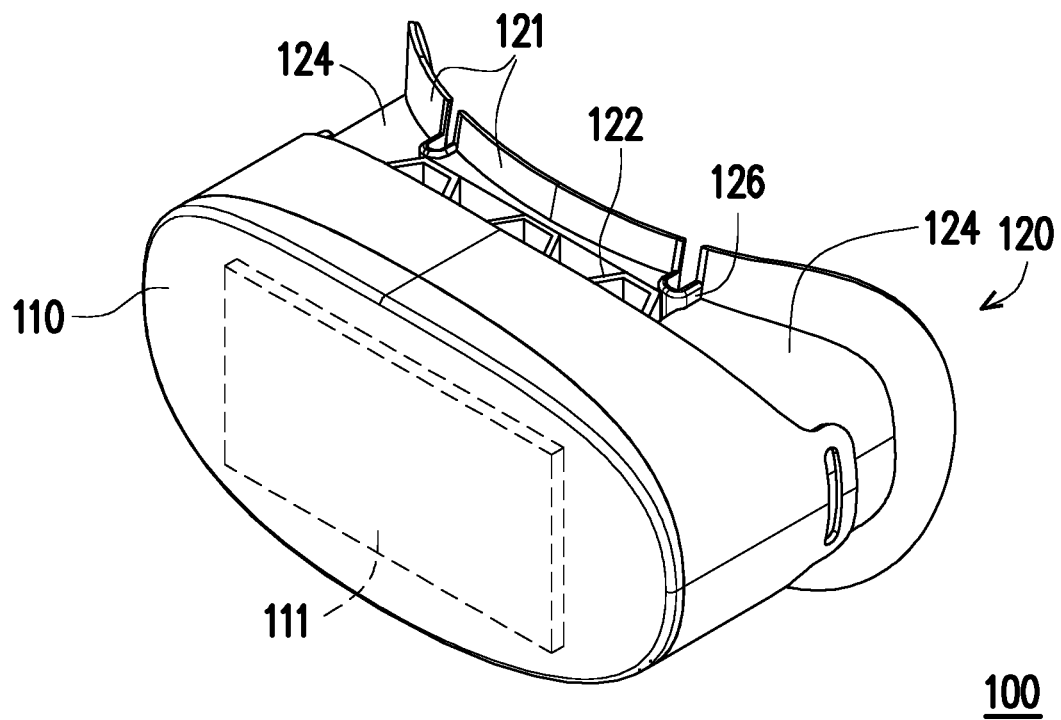
FIG. 1 is a schematic three-dimensional view of a head-mounted display device according to an embodiment of the disclosure.
Figure 2:
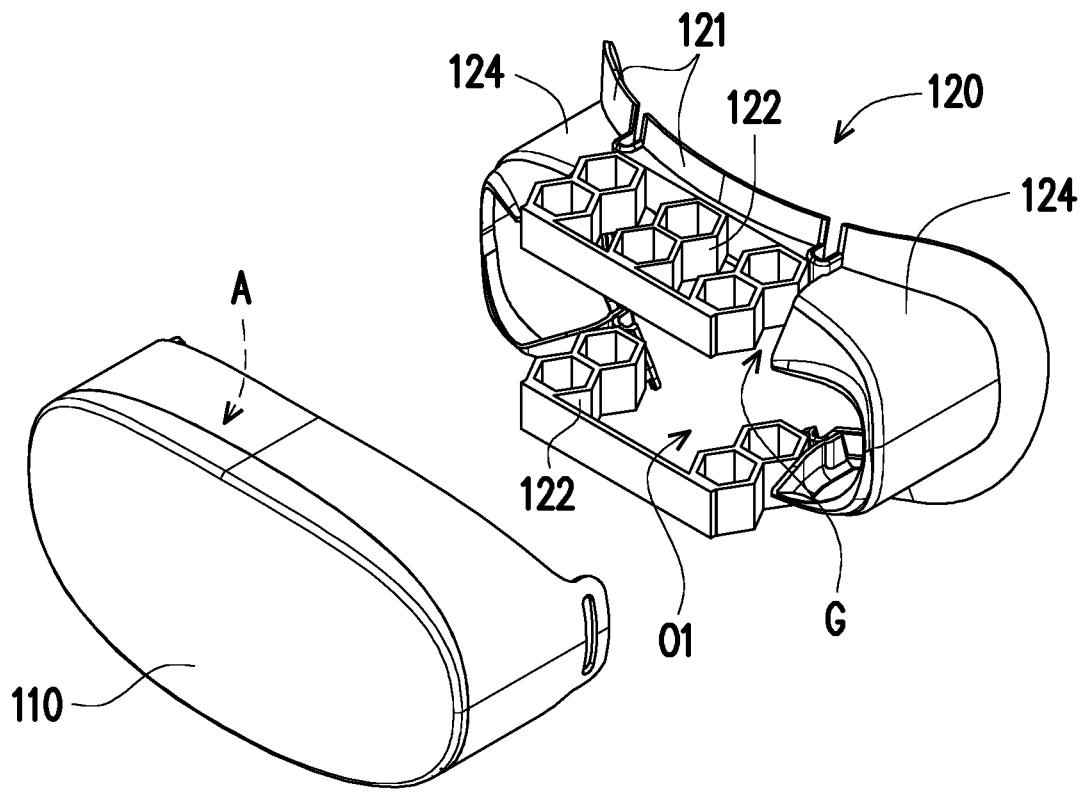
FIG. 2 is an exploded view of the head-mounted display device in FIG. 1.

FIG. 1 is a schematic three-dimensional schematic view of a head-mounted display device according to an embodiment of the disclosure. FIG. 2 is an exploded view of the head-mounted display device in FIG. 1. Referring to FIG. 1 and FIG. 2, a head-mounted display device 100 includes a front piece 110 and an annular piece 120. The front piece 110 may include components such as an optical system (not illustrated) and a protection external housing, and may be disposed with a display device 111 or adapted for placing a display device 111. The display device 111 may be a built-in display device or an added portable display device (such as a smart phone), but the disclosure is not limited thereto. The type of the display device 111 may be adjusted according to the appliance of the head-mounted display device 100 in a virtual reality system, an augmented reality system or a mixed reality system. The optical system includes optical pieces adapted for changing light path of display, such as a lens, a light guiding part or a prism, but the disclosure is not limited thereto.

The annular piece 120 is adapted to contact an user's face. In specific, the annular piece 120 has a contact portion 121 contacting the user's face so that the ambient light does not enter the head-mounted display device 100 via the gap between the annular piece 120 and the user's face. In this embodiment, a material of the annular piece 120 includes, for example, a material having flexible thermoplastic urethane (TPU), a foam material, a flexible material, a rubber material, an air cushion material, a water cushion material, a multi-layer material and a soft polymer material, such that the user may feel more comfortable when wearing the head-mounted display device 100. In some embodiments, the annular piece 120 may be composed by a plurality of partially-independent arc members, such as three partially-independent arc members in the embodiment shown in FIG. 1 to FIG. 5 or two partially-independent arc members in the embodiment shown in FIG. 6. In the embodiment shown in FIG. 7 to FIG. 8B, the annular piece 120 is one integrated structure. However, the disclosure is not limited thereto.

The annular piece 120 has a pair of compression portions 122 and a pair of rotating portions 124, and the pair of rotating portions 124 are respectively located at two opposite ends of each of the pair of compression portions 122. The annular piece 120 is connected to the front piece 110 via the pair of compression portions 122. In detail, in this embodiment, the front piece 110 has an accommodation space A, and the annular piece 120 is disposed in the accommodation A and is connected to the front piece 110 via a part of the annular piece 120 closest to the front piece 110. In addition, the contact portion 121 may be formed respectively with the compression portions 122 or the rotating portions 124 integrally or may be fabricated independently and then assembled together, and the disclosure is not limited thereto. A material of the compression portions 122 and the rotating portions 124 includes foam materials respectively having different flexibility. For example, in this embodiment, the material of the compression portions 122 and the rotating portions 124 includes foam materials respectively having different compression proportions, and the disclosure is also not limited thereto.

Figure 3A:
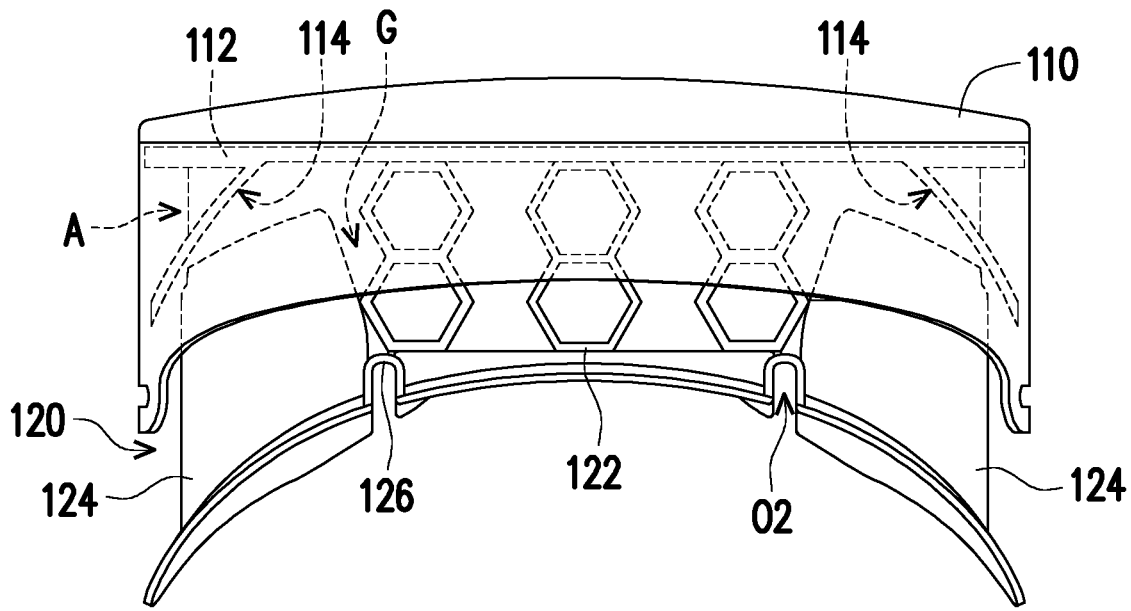
FIG. 3A and FIG. 3B are respectively schematic top views of the head-mounted display device of FIG. 1 in a non-using condition and in a using condition.
Figure 3B:
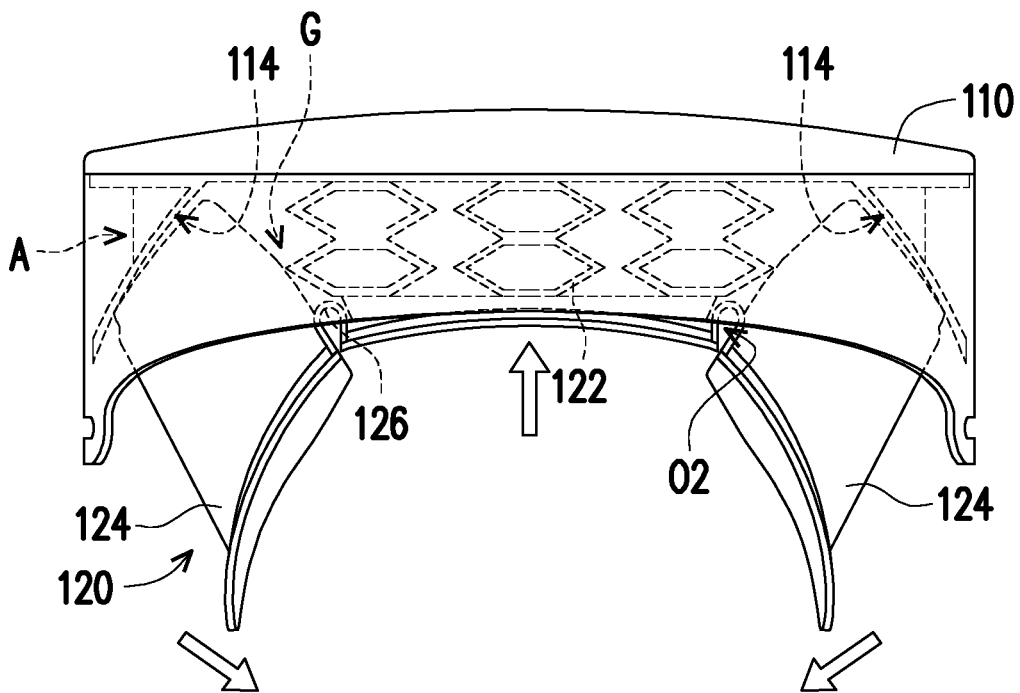

In this embodiment, the pair of compression portions 122 are a honeycomb-shaped hollow structure, and the honeycomb-shaped hollow structure may change the shape of the structure when pressurized by different forces, as the change of shapes of the structure shown in FIG. 3A to FIG. 3B. In specific, a part of the pair of compression portions 122 close to the front piece 110 is formed by a plurality of honeycomb structures, and the plurality of honeycomb structures have flexibility and are hollow structures. Therefore, the pair of compression portions 122 may be compressed through the honeycomb-shaped hollow structure. In other words, if no external forces are continuously applied to the compressed pair of compression portions 122 to maintain the shape, the pair of compression portions 122 restore back to the original shape by its own elasticity.

In this embodiment, one of the pair of compression portions 122 has a first opening O1 adapted for accommodating the user's nose. In detail, in the annular piece 120, the compressing portion 122 on a side close to the user's nose has two honeycomb-shaped hollow structures and the first opening O1 located between the two honeycomb-shaped hollow structures. The accommodation space between the two honeycomb-shaped hollow structures (i.e. the first opening O1) is used for accommodating the user's nose. As such, the user does not feel pressured on his/her nose because of wearing the head-mounted display device 100 for a long time and has a more comfortable experience when using the head-mounted display device 100.

FIG. 3A and FIG. 3B are respectively schematic top views of the head-mounted display device in FIG. 1 in a non-using condition and in a using condition. The above-mentioned using condition represents the condition that the pair of compression portions 122 being compressed by the user when the user is wearing the head-mounted display device. Referring to FIG. 2 to FIG. 3B, in this embodiment, the pair of compression portions 122 are compressed toward the front piece 110 by the user's face, the pair of rotating portions 124 are rotated relative to the pair of compression portions 122 by the pair of compression portions 124 being compressed, and rotation directions of the pair of rotating portions 124 are opposite to each other. In detail, the pair of rotating portions 124 respectively include a rotating pivot (i.e. the connection portion 126) and both are rotated toward the center, as illustrated in FIG. 3B. As such, when the user is wearing the head-mounted display device 100, as the pair of rotating portions 124 are rotated by the user's face applying an external force to the pair of compressing portions 122, the pair of rotating portions 124 fit the peripheral region of the user's eyes and thereby effectively block the external ambient light form entering the head-mounted display device 100, so that the user obtains a better experience.

In detail, in this embodiment, the annular piece 120 further has at least one connection portion 126 connected between the pair of compression portions 122 and the pair of rotating portions 124 to form a gap G, such that the pair of rotating portions 124 may be moved or rotated freely without obstructions by the pair of compression portions 122. In this embodiment, the at least one connection portion 126 is a U-shaped structure and has a second opening O2 facing toward a side away from the front piece 110. The pair of rotating portions 124 are bent toward the second opening O2 by the pair of compression portions 122 being compressed. As such, when the pair of rotating portions 124 are pulled by the pair of compression portions 122 being compressed inward, the pair of rotating portions 124 may use the space within the second opening O2 to be moved or rotated toward the center. In other embodiments, the connection portion 126 may also be a structure in other shape, and the disclosure is not limited thereto.

Moreover, in this embodiment, the front piece 110 further includes at least one guide piece 112, and the at least one guide piece 112 makes the pair of rotating portions 124 in rotation slide according to the at least one guide piece 112. In specific, in this embodiment, the front piece 110 includes a pair of the guide pieces 112 corresponding to the pair of rotating portions 124 respectively. Each of the at least one guide piece 112 has a guide bevel 114, and the guide bevel 114 inclines toward the annular piece 120 in a direction from adjacent to the pair of compression portions 122 to away from the pair of compression portions 122. Furthermore, in this embodiment, the guide bevel 114 has different slopes in different positions. In other words, the guide bevel 114 may be a curved surface. As such, when the user compresses the pair of the compression portions 122 on the center by the face, the guide pieces 112 located on the left and right sides respectively slide on the corresponding guide bevels 114 and thereby generate rotations. As such, the guide piece 112 being rotating fit the peripheral of the user's eyes by a side close to the user, and thereby effectively block the external ambient light from entering the head-mounted display device 100, so that the user obtains a better experience.

Figure 4A:
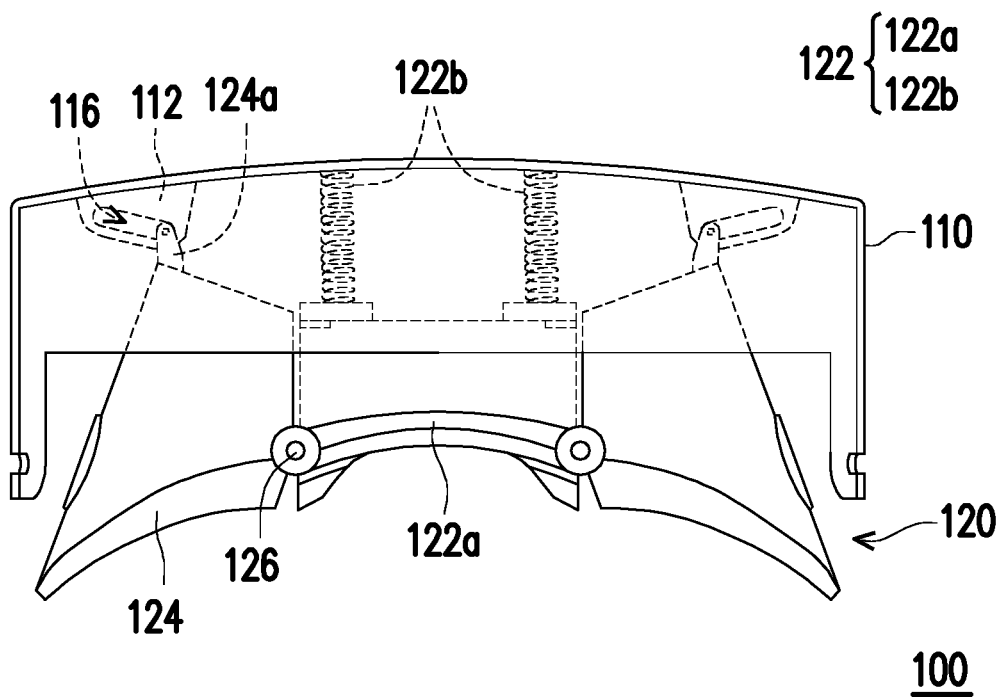
FIG. 4A and FIG. 4B are respectively schematic top views of the head-mounted display device in a non-using condition and in a using condition, according to another embodiment of the disclosure.
Figure 4B:
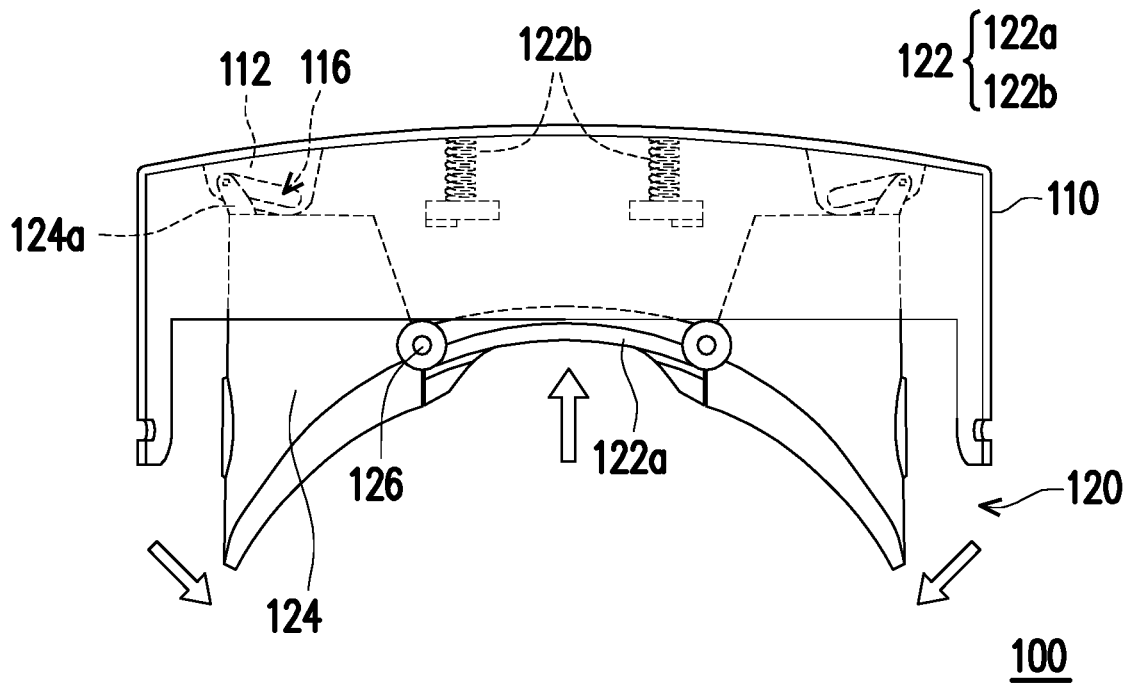

FIG. 4A and FIG. 4B are respectively schematic top views of the head-mounted display device in a non-using condition and in a using condition, according to another embodiment of the disclosure. The above-mentioned using condition represents the condition that the pair of compression portions 122 being compressed by the user when worn by the user. Referring to FIG. 4A and FIG. 4B, the head-mounted display device 100 of the embodiment in this embodiment is similar to the head-mounted display device 100 of the in FIG. 3A and FIG. 3B. The difference between the two is that, in this embodiment, the pair of compression portions 122 include a bearing portion 122a and at least one spring structure 122b. The spring structure 122b is two, for example, and is disposed between the bearing portion 122a and the front piece 110. As such, in this embodiment, the pair of compression portions 122 may be compressed toward the front piece 110 by the spring structure 122b.

In this embodiment, at least one guide piece 112 in the front piece 110 has a guide rail 116, and each of the rotating portions 124 includes a connecting rod portion 124a. One end of the connecting rod portion 124a is pivotally connected in the guide rail 116. As such, two rotating portions 124 may be rotated by the connecting rod portion 124a sliding in the guide rail 116. In specific, in this embodiment, the connection portion 126 is a hinge structure, such that the pair of rotating portions 124 may pivot relative to the pair of compression portions 122 with the hinge structure. In detail, when the pair of compression portions 122 are compressed toward the front piece 110, an end of the pair of rotating portions 124 close to the front piece 110 slides toward an external side of the front piece 110 by the connecting rod portion 124a on the guide rail 116, thereby brings the pair of rotating portions 124 to be rotated toward the center of the front piece 110 with the connection portion 126 as a pivot.

Figure 5:
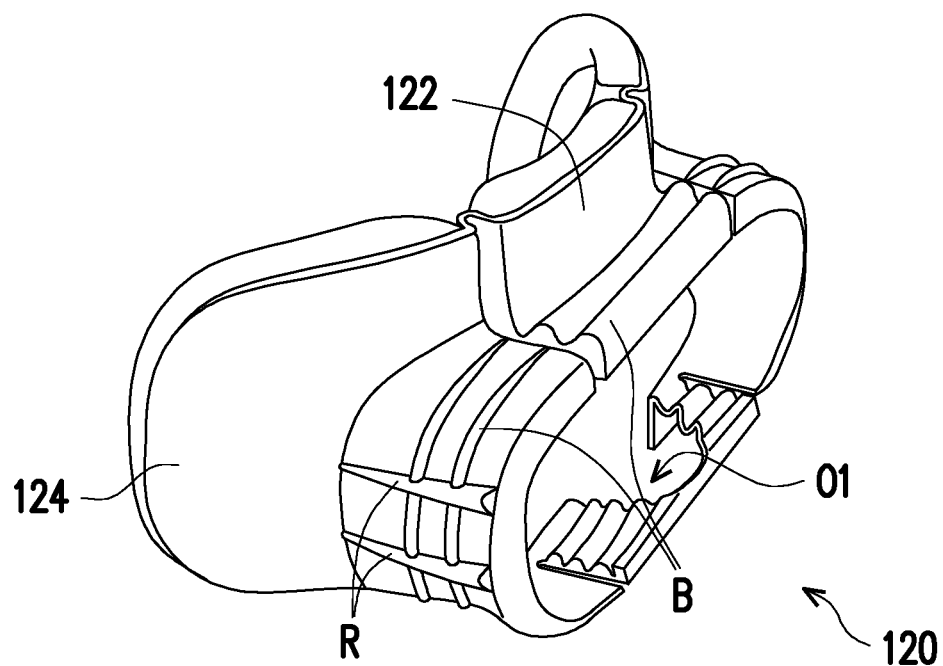
FIG. 5 is a schematic three-dimensional view of a head-mounted display device according to another embodiment of the disclosure.

FIG. 5 is a schematic three-dimensional view of an annular piece according to another embodiment of the disclosure. Referring to FIG. 5, an annular piece 120 in this embodiment is similar to the annular piece 120 in FIG. 1. The difference between the two is that, in this embodiment, the pair of compression portions 122 or the rotating portions 124 located on the two ends of the pair of compression portions 122 have a bellow tube structure B. As such, when the user applies an external force toward the pair of compression portions 122, the pair of compression portions 122 may generate elastic compression with the bellow tube structure B. Besides, the bellow tube structure B in this embodiment includes at least two sections of bellow structures having different compression ratios. As such, the compression portions 122 or the rotating portions 124 can generate in a small rotation to fit the contour of the user's face, further increasing the tightness with which the eyes are covered. On the other hand, in this embodiment, the bellow tube structure B of the pair of rotating portions 124 further has a reinforcing rib structure R, which is located on a side of the bellow tube structure B away from the pair of compression portions 122. As such, the pair of compression portions 122 and the pair of rotating portions 124 respectively have compression in different degrees, such that the pair of rotating portions 124 are easy to be rotated or to be compressed toward the center.

Figure 6:
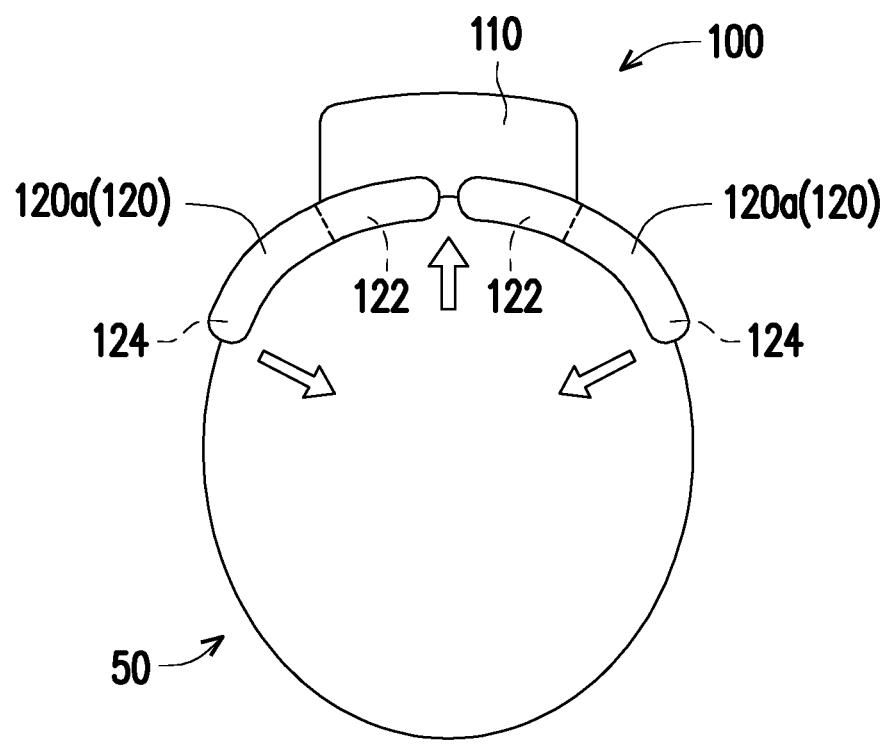
FIG. 6 is a schematic top view of a head-mounted display device according to another embodiment of the disclosure.

FIG. 6 is a schematic top view of a head-mounted display device according to another embodiment of the disclosure. Referring to FIG. 6, an annular piece 120 of the head-mounted display device of this embodiment is similar to the annular piece 120 in FIG. 5. The difference between the two is that, in this embodiment, the annular piece 120 includes a pair of sub-annular pieces 120a respectively located on the left side and the right side, each of the sub-annular pieces 120 includes a corresponding compression portion 122 and a corresponding rotating portion 124. In other words, the annular piece 120 may be formed by two individual components. As such, when a user 50 applies an external force toward the annular piece 120, a part of the pair of sub-annular pieces 120a closer to the annular piece 120 (i.e. the compression portion) would be compressed and pulls another part of the pair of sub-annular pieces 120a away from the center of the annular piece 120 (i.e. the rotating portion) to be rotated toward the face of the user 50 and fit the peripheral of the eyes of the user 50.

Figure 7:
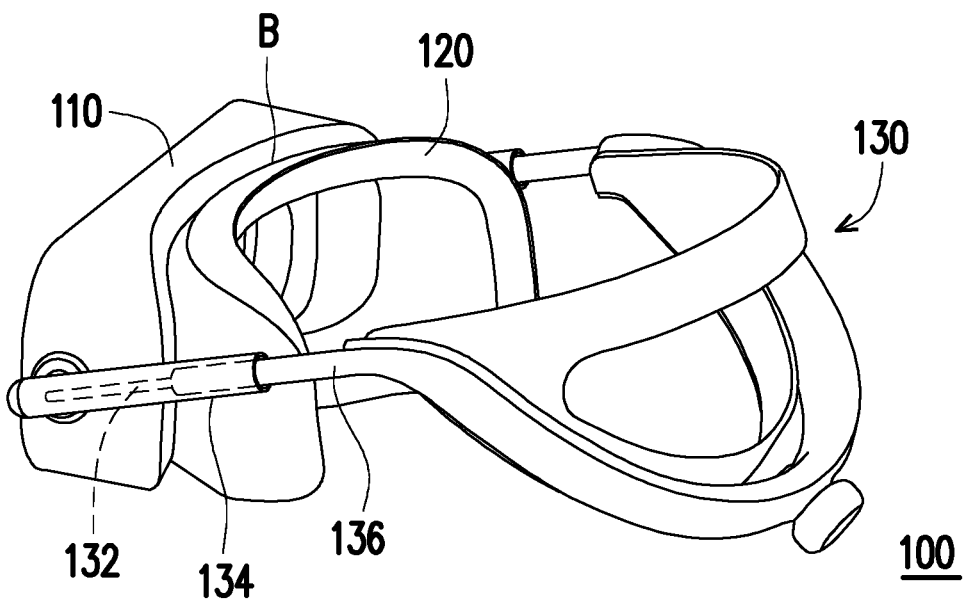
FIG. 7 is a schematic three-dimensional view of a head-mounted display device according to another embodiment of the disclosure.
Figure 8A:
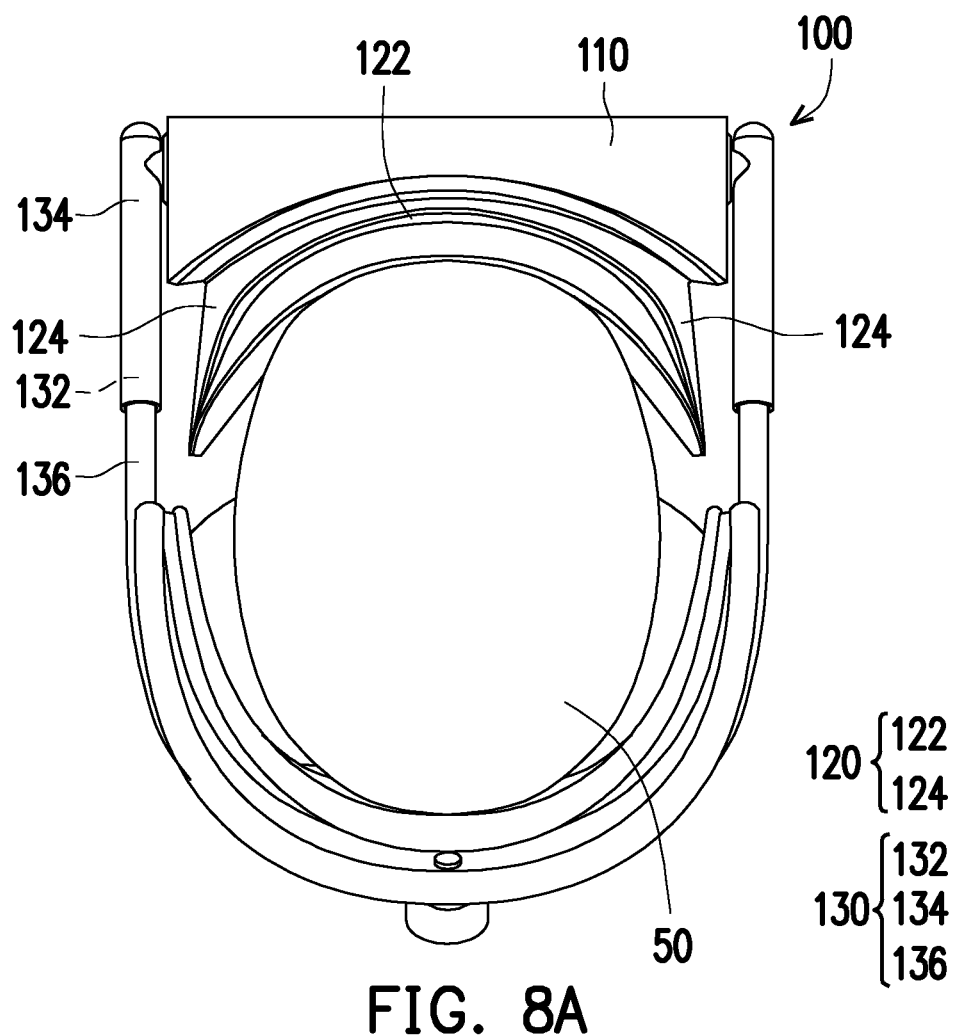
FIG. 8A and FIG. 8B are respectively schematic top views of the head-mounted display device in FIG. 7 in a non-using condition and in a using condition.
Figure 8B:
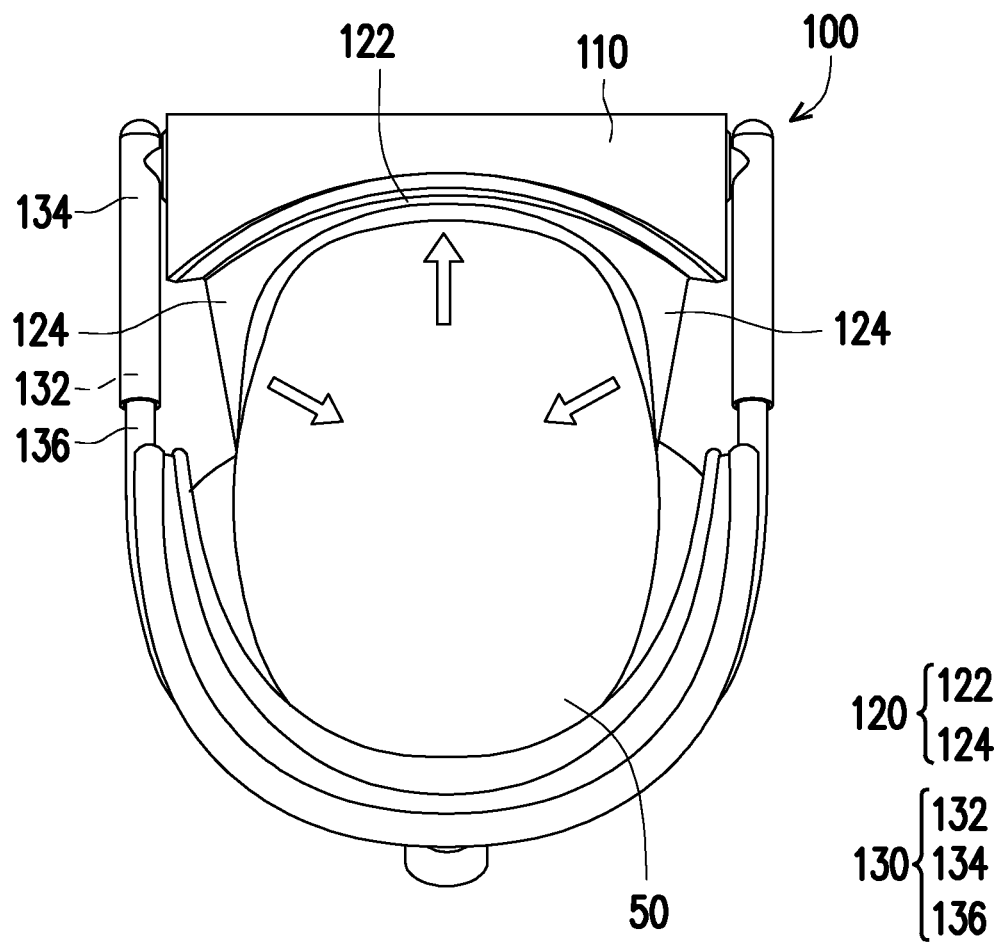

FIG. 7 is a schematic three-dimensional view of a head-mounted display device according to another embodiment of the disclosure. FIG. 8A and FIG. 8B are respectively schematic top views of the head-mounted display device in FIG. 7 in a non-using condition and in a using condition. Referring to FIG. 7A to FIG. 8B, a head-mounted display device 100 in this embodiment is similar to the head-mounted display device 100 in FIG. 1. The difference between the two is that, in this embodiment, the annular piece 120 of the head-mounted display device 100 is integrally formed. In specific, the annular piece 120 is a recessed structure and has a bellow tube structure B similar to the bellow tube structure B of the annular piece 120 in FIG. 5, and the pair of compression portions 122 have a thickness greater than or equal to a thickness of the pair of rotating portions 124. In other words, the compression portions 122 or the rotating portions 124 respectively have at least two parts with different compression ratios. As such, when in use, the annular piece 120 makes the pair of rotating portions 124 bent toward the center of the annular piece 120 by the pair of compression portions 122 being compressed by the user 50, as illustrated in FIG. 8. As such, with the bending of the annular piece 120, the pair of rotating portions 124 may fit the peripheral region of the user's eyes and thereby effectively block the external ambient light from entering the head-mounted display device 100C, so that the user obtains a better experience.

In this embodiment, the head-mounted display device 100 further includes an adjustable wearable component 130, which is connected to the front piece 110 and the annular piece 120. In addition, the adjustable wearable component 130 includes a retractable mechanism 132, which is, for example, a flexible string, and may be used to adjust a distance from the front piece 110 or the annular piece 120 to the adjustable wearable component 130. In other embodiments, the user may wear or remove the adjustable wearable component according to use conditions and may also choose the type of the adjustable wearable component according to user preference, and the disclosure is not limited thereto.

In specific, the adjustable wearable component 130 further includes a guide tube 134 and a rear support structure 136. The retractable mechanism 132 is disposed in the guide tube 134, an end of the guide tube 134 is connected to the front piece 110 or the annular piece 120, and the retractable mechanism 132 is connected to the front piece 110 or the annular piece 120 via an end of the guide tube 134 and connected to the rear support structure 136 via another end of the guide tube 134. As such, the user may stretch the rear support structure 136 by the contour of the head or other means, such that, after the eyes of the user 50 rest on the annular piece 120, the rear support structure 136 can be pulled back by the flexibility of the retractable mechanism 132 to hold the head-mounted display device 100 on the head of the user 50, as shown in FIG. 8B.

In sum of the foregoing, in the embodiments of the disclosure, the annular piece includes a pair of compression portions and a pair of rotating portions, the head-mounted display device is compressed toward the front piece by an external force applied by the user's face. Also, by the pair of compression portions being compressed, the pair of rotating portions are rotated relative to the pair of compression portions so as to fit the peripheral of the user's eyes and thereby effectively block the external ambient light from entering the head-mounted display device, so that the user obtains a better experience.

Although the disclosure has been described with reference to the above embodiments, the disclosure is not limited to the above embodiments. It is apparent to one of ordinary skill in the art that modifications and variations to the described embodiments may be made without departing from the spirit and scope of the disclosure. Accordingly, the scope of the disclosure will be defined by the attached claims.

What is claimed is:

1. A head-mounted display device, comprising:
   a front piece, adapted for placing a display device; and
   an annular piece, comprising a pair of compression portions and a pair of rotating portions, wherein the pair of rotating portions are respectively located on two opposite ends of each of the pair of compression portions, the annular piece is connected to the front piece via the pair of compression portions, when the pair of compression portions are compressed toward the front piece, the pair of rotating portions are adapted to be rotated relative to the pair of compression portions by the pair of compression portions being compressed, and rotation directions of the pair of rotating portions are opposite to each other, wherein the front piece has an accommodation space, the annular piece is disposed in the accommodation space, and the front piece covers a part of the annular piece so that the pair of rotating portions is adapted to rotate in the accommodation space relative to the front piece.

2. The head-mounted display device according to claim 1, wherein the front piece further comprises at least one guide piece, and the at least one guide piece makes the pair of rotating portions in rotation slide according to the at least one guide piece.

3. The head-mounted display device according to claim 2, wherein the at least one guide piece has at least one guide bevel, and the at least one guide bevel inclines toward the annular piece in a direction from adjacent to the pair of compression portions to away from the pair of compression portions.

4. The head-mounted display device according to claim 3, wherein the guide bevel has different slopes in different positions.

5. The head-mounted display device according to claim 2, wherein the at least one guide piece has a guide rail, each of the rotating portions comprises a connecting rod portion, one end of the connecting rod portion is pivotally connected to the guide rail, and the pair of rotating portions are adapted to be rotated by the connecting rod portion sliding in the guide rail.

6. The head-mounted display device according to claim 1, wherein the annular piece further has at least one connection portion, and the at least one connection portion is connected between the pair of compression portions and the pair of rotating portions to form a gap.

7. The head-mounted display device according to claim 6, wherein the at least one connection portion is a U-shaped structure and has a second opening, the second opening facing toward a side away from the front piece, and the pair of rotating portions are adapted to be bent toward the second opening by the pair of compression portions being compressed.

8. The head-mounted display device according to claim 6, wherein the at least one connection portion is a hinge structure, such that the pair of rotating portions pivot relative to the pair of compression portions with the hinge structure.

9. The head-mounted display device according to claim 1, wherein the pair of compression portions are a honeycomb-shaped hollow structure.

10. The head-mounted display device according to claim 1, wherein the pair of compression portions comprise a bearing portion and at least one spring structure, and the at least one spring structure is disposed between the bearing portion and the front piece.

11. The head-mounted display device according to claim 1, wherein a material of the annular piece comprises thermoplastic urethane having flexibility.

12. The head-mounted display device according to claim 1, wherein a material of the pair of compression portions and the pair of rotating portions comprise foam materials respectively having different flexibility.

13. The head-mounted display device according to claim 1, wherein a material of the pair of compression portions and the pair of rotating portions comprise foam materials respectively having different compression ratios.

14. The head-mounted display device according to claim 1, wherein one of the pair of compression portions has a first opening.

15. A head-mounted display device, comprising:
   a front piece, disposed with a display device; and
   an annular piece, comprising a pair of compression portions and a pair of rotating portions, wherein the pair of rotating portions are respectively located at two opposite ends of each of the pair of compression portions, the annular piece is connected to the front piece via the pair of compression portions, when the pair of compression portions are compressed toward the front piece, the pair of rotating portions are adapted to be rotated relative to the pair of compression portions by the pair of compression portions being compressed, and rotation directions of the pair of rotating portions are opposite to each other, wherein the front piece has an accommodation space, the annular piece is disposed in the accommodation space, and the front piece covers a part of the annular piece so that the pair of rotating portions is adapted to rotate in the accommodation space relative to the front piece.

* * * * *